UNITED STATES PATENT OFFICE 2,657,974

SAND MOLD BINDERS

Robert Ruffin Cook, Springfield, and Arnold C. Hatch, Longmeadow, Mass., assignors to Monsanto Chemical Company, St. Louis, Mo., a corporation of Delaware No Drawing. Application August 23, 1951, Serial No. 243,354

6 Claims. (Cl. 22—188)

This invention relates to sand-binder mixtures for use in preparing foundry sand cores and molds. More particularly, invention relates to sand-binder mixtures which are peculiarly adapted for use in the shell molding process of preparing foundry sand molds and cores.

The physical and chemical properties of sand-binder mixtures to be used in the standard process for making sand molds and cores are quite different from the properties required in the shell molding process. This process is a technique for the production of a mold or core that is composed of a shell of sand bonded together by a thermosetting resin. Shell thicknesses vary between ⅛ inch and ½ inch depending on the size of the casting to be made. Molds made by this technique weigh but a small fraction of those made by the older methods.

For the standard process, the sand-binder mixtures should have high green strength, and the resin should tend to migrate towards the surface of the sand core during the curing process. For the shell molding process, the sand-binder mixture must have relatively little green strength and the tendency for the resin to migrate towards the heated pattern and to the mold surface in the curing stage should be low.

Attempts to use the standard sand-binder mixtures for the shell molding process have been only partially successful and have pointed out the need for a different type of sand-binder mixture.

One object of this invention is to provide sand-binder mixtures suitable for use in preparing foundry sand cores and molds by the shell molding process.

A further object of this invention is to provide sand-binder mixtures which will be substantially non-dusting, have substantially no green strength, and in which the binder will show little tendency to migrate during forming and curing operations.

These and other objects are attained by providing mixtures comprising foundry sand, a dry fusible thermosettable resin and a tetra alkyl, tetra aralkyl or tetra aryl orthosilicate.

The following examples are given in illustration and are not intended as limitations on the scope of this invention. Where parts are mentioned, they are parts by weight.

Example I

A sand-binder mixture was prepared by mulling 10,000 parts of 100-mesh foundry sand with 50 parts of tetra ethyl orthosilicate, adding to this mixture 600 parts of a 200-mesh dry fusible and settable phenol-formaldehyde resin, and further mulling the mixture for about 6 minutes. The product obtained was a dust-free mixture which had no observable green strength. When molded into a test bar by the shell molding process, no migration of the resin towards the hot pattern could be detected, i. e., the resin content of the unmolded sand and that of the molded bar was the same and the resin concentration in the bar was substantially uniform throughout.

Example II

Example I was repeated except that the order of adding the ingredients was changed. The tetraethyl orthosilicate was added to the resin and after a short mulling period the sand was incorporated with continued mulling. The completed mixture had similar properties to the sand mixture of Example I.

When the tetraethyl orthosilicate was left out of the mixture of the above examples, a dusty product was obtained and the concentration of the resin in the test bar showed a graduation with the greatest amount of resin being next to the surface of the bar which had been in direct contact with the heated pattern.

All of the test bars referred to above were prepared by heating a measured amount of the sand-binder mixture in a bar die for 2 minutes at 600° F.

Example III

A sand-binder mixture was prepared by mulling 10,000 parts of 100-mesh foundry sand with 600 parts of a 200-mesh dry, fusible and settable phenol-formaldehyde resin for 2 minutes. Then, 6 parts of tetrabutyl orthosilicate were added to the muller and mulling was continued for about 6 minutes. The resultant mixture was a free-flowing material which showed no signs of dusting. A shell mold was prepared using, as a pattern, a plug for a gate valve. The pattern was mounted on a match plate and the assembly was heated to about 350° F. The sand-binder mixture was poured over the pattern to a depth of about 5 inches. After 10 seconds, the match plate was inverted and the sand-binder mixture flowed freely away from the pattern except for a shell about ⅛ inch thick. The shell was placed in an oven for about 2 minutes at 560° F. to complete the cure of the resin. It was then removed from the pattern and match plate. The shell mold was found to be smooth surfaced and to have taken on the exact configurations of the pattern. No substantial migration of resin to the surface of the mold could be detected.

Example IV

A sand-binder composition was prepared by mulling 10,000 parts of 100-mesh foundry sand with 700 parts of a dry 200-mesh fusible and settable urea-formaldehyde resin. Thirty parts of a tetra aryl orthosilicate in which the aryl groups were a mixture of phenyl and cresyl groups, were added to the muller and mulling was continued for about 6 minutes. A dust-free mixture was obtained which was free-flowing and had substantially no green strength. A shell mold in the form of a plug for a gate valve was made under the conditions shown in Example III. A strong smooth-surfaced mold was obtained having uniform resin content throughout the mold.

When a similar sand-binder composition was prepared without the addition of the orthosilicate, the mixture obtained was quite dusty and free-flowing. It could be molded by the shell molding process but the resin concentration in the mold was uneven. The ultimate strength of the cured mold was about the same as the strength of the mold made from the mixture modified with the orthosilicate.

Various tetra alkyl, tetra aralkyl and tetra aryl orthosilicates may be substituted for the compounds shown in the examples, e. g., tetra alkyl orthosilicates in which the alkyl group contains from 2 to 20 carbon atoms including ethyl, propyl, amyl, butyl, octyl, decyl, lauryl, palmityl, stearyl, eicosyl, etc. groups. Among the aryl orthosilicates that may be used are the phenyl, cresyl, xylenyl, naphthyl, etc. esters. Examples of aralkyl orthosilicates are benzyl, phenethyl, etc. orthosilicates. Mixed esters of orthosilicic acid may be used. The amount of orthosilicate may be varied between 0.1 and 1.0% by weight of the sand.

The resin binders which may be used are thermosetting resins in a solid, fusible form. Among such resins are compounds prepared by condensing formaldehyde with phenol, urea or melamine or mixtures thereof. The reaction is carried out until the condensation product can be recovered from the reaction medium in a solid fusible state. The amount of resin in the sand-binder mixture may range from 5 to about 10% by weight based on the weight of the sand.

The sands used for preparing the mixtures are washed silica sands having a fineness range within the A. F. S. limits of about 75 to about 200. For the best results, the sand grains should be predominantly rounded and should have a high fusion point.

The conditions for preparing the molds or cores from the sand-binder-orthosilicate mixtures are the standard conditions normally used in the foundry industry when a resin binder is employed. Thus, mulling time and temperature conditions during forming and curing operations may be varied to suit the molds and cores to be produced and the choice of the proper conditions is well within the scope of a skilled operator's abilities.

It is obvious that variations may be made in the products and processes of this invention without departing from the spirit and scope thereof as defined by the appended claims.

What is claimed is:

1. A composition for forming sand molds and cores, comprising an unreacted intimate mixture of foundry sand, a solid, fusible thermosetting resin binder and a compound taken from the group consisting of tetra alkyl, tetra aralkyl and tetra aryl orthosilicates, said resin being present in amounts ranging from 5% to 10% by weight based on the weight of the sand, and said silicate being present in amounts ranging from 0.1% to 1.0% by weight based on the weight of the sand.

2. A composition as in claim 1 wherein the binder is a phenol-formaldehyde resin.

3. A composition as in claim 1 wherein the binder is a urea-formaldehyde resin.

4. A composition as in claim 1 wherein the silicate is tetraethyl orthosilicate.

5. A composition as in claim 1 wherein the silicate is tetrabutyl orthosilicate.

6. A composition as in claim 1 wherein the binder is a phenol-formaldehyde resin and the silicate is tetraethyl orthosilicate.

ROBERT RUFFIN COOK.
ARNOLD C. HATCH.

References Cited in the file of this patent

UNITED STATES PATENTS

| Number | Name | Date |
| --- | --- | --- |
| 1,439,056 | Baekeland | Dec. 19, 1922 |
| 2,027,932 | Ray | Jan. 14, 1936 |
| 2,182,208 | Nason | Dec. 5, 1939 |

OTHER REFERENCES

The Foundry, August 1950, pages 92, 93, 95 and 212.